(12) United States Patent
Starbatty et al.

(10) Patent No.: US 8,556,733 B2
(45) Date of Patent: Oct. 15, 2013

(54) LENGTH-ADJUSTABLE SHAFT

(75) Inventors: Frank Starbatty, Heidenheim (DE); Herbert Richter, Aalen (DE)

(73) Assignee: Voith Patent GmbH, Heidenheim (DE)

( * ) Notice: Subject to any disclaimer, the term of this patent is extended or adjusted under 35 U.S.C. 154(b) by 211 days.

(21) Appl. No.: 12/735,447

(22) PCT Filed: Jan. 10, 2009

(86) PCT No.: PCT/EP2009/000099
§ 371 (c)(1), (2), (4) Date: Sep. 28, 2010

(87) PCT Pub. No.: WO2009/095150
PCT Pub. Date: Aug. 6, 2009

(65) Prior Publication Data
US 2011/0028222 A1    Feb. 3, 2011

(30) Foreign Application Priority Data
Jan. 31, 2008   (DE) .......................... 10 2008 007 153

(51) Int. Cl.
*F16C 3/035*    (2006.01)

(52) U.S. Cl.
USPC .......................................... 464/17; 464/167

(58) Field of Classification Search
USPC .................................... 464/7, 11, 16, 17, 162
See application file for complete search history.

(56) References Cited

U.S. PATENT DOCUMENTS

| | | | |
|---|---|---|---|
| 3,543,536 A | 12/1970 | Rekow | |
| 4,308,729 A | 1/1982 | Condon | |
| 4,508,522 A * | 4/1985 | Numazawa et al. | 464/11 |
| 4,819,755 A | 4/1989 | Smemo | |
| 5,366,043 A * | 11/1994 | Kretschmer et al. | 464/162 X |
| 5,716,276 A * | 2/1998 | Mangas et al. | 464/16 |
| 6,722,991 B2 * | 4/2004 | Chrobak et al. | 464/17 |
| 2001/0007831 A1 | 7/2001 | Edi | |

FOREIGN PATENT DOCUMENTS

| | | | | |
|---|---|---|---|---|
| DE | 918007 C1 | 9/1954 | | |
| DE | 19962212 A1 | 8/2000 | | |
| DE | 60120815 T | 1/2007 | | |
| EP | 0465440 B1 | 9/1994 | | |
| FR | 2697596 A1 | 5/1994 | | |
| GB | 2343154 A | 5/2000 | | |
| SE | 0702642 | 5/2009 | | |
| SU | 635321 | * | 11/1978 | 464/16 |
| SU | 744161 | * | 6/1980 | 464/17 |

* cited by examiner

*Primary Examiner* — Gregory Binda
(74) *Attorney, Agent, or Firm* — Farjami & Farjami LLP

(57) ABSTRACT

A length-adjustable shaft comprises an outer sleeve-shaped axial part; an inner axial part which can be pushed into and deployed out of the outer axial part in a telescopic fashion and which encloses a buffer chamber; having a bearing which is arranged between the two axial parts and which can be lubricated with a lubricant; that end of the inner axial part which can be pushed into the outer axial part has an end wall; a ventilation opening is provided which connects, in a conducting fashion, the buffer chamber to the cavity which is enclosed by the outer axial part, and the ventilation opening comprises at least one bore which is offset with respect to the rotational axis of the shaft.

14 Claims, 4 Drawing Sheets

LENGTH-ADJUSTABLE SHAFT

This is a U.S. national phase application which is based on, and claims priority from, PCT application Ser. No. PCT/EP2009/000099, filed Jan. 10, 2009, which claims priority from foreign application Serial No. 10 2008 007 153.6, filed Jan. 31, 2008 in Germany.

BACKGROUND

The invention relates to a length-adjustable shaft, comprising an outer and inner axial part which cooperate with one another in the manner of a telescope. Such shafts are cardan shafts which are used in rolling mills for driving rollers. Shafts of this kind are also used in the construction of vehicles, e.g. in wheelsets of rail vehicles (see SE 0702642). The invention is based on this state of the art.

SUMMARY

The shaft comprises two parts, which are an outer sleeve-like axial part and an inner axial part. The inner axial part is displaceable in a telescopic fashion within the outer axial part in the axial direction in a limited way. The length of the entire shaft can thus be changed within certain limits.

A bearing is provided between the two axial parts. It can comprise three or more rolling bearings for example. The bearings are arranged with their longitudinal axis perpendicularly in relation to the rotational axis of the roller. Each bearing is carried by an inner axial part and engages in a longitudinal groove of the sleeve-like outer axial part. The bearings are lubricated with a lubricant, e.g. with oil. The inner axial part has an expansion chamber and further a face wall which immerses into the space which is enclosed by the sleeve-like axial outer part.

A vent opening is provided in the face wall. It produces a conductive connection between the two mentioned cavities. When the shaft is shortened by pushing the inner axial part into the outer axial part, the air is displaced into the cavity. The air is compressed and thus exerts a damping effect.

One problem is that lubricant will deposit over time in the vent opening and will seal the opening. This is caused by the fact that during operation lubricant vapors will accumulate in the space enclosed by the outer axial part, which vapors will deposit in the vent opening.

The invention is based on the object of providing a length-adjustable shaft in such a way that the vent opening will not get blocked at all or will remain open for a longer period of time than previously.

Accordingly, the vent opening comprises at least one bore, the longitudinal axis of which extends eccentrically in relation to the rotational axis of the shaft or is offset in relation to the same in the radial direction. The longitudinal axis of the bore will generally extend parallel to the rotational axis of the shaft.

This leads to the following result during operation of the shaft:

Lubricant will still deposit in the bore from the air laden with the lubricant mist. As a result of the eccentricity of the longitudinal axis of the bore in relation to the rotational axis of the shaft, the lubricant will only deposit in the radially outer region of the bore, so that the radial inner region of the bore will remain free. No closed lubricant ring will thus be produced in the bore. Rather, the deposit of lubricant is formed like the crescent of a moon, when seen in a sectional view perpendicular to the longitudinal axis of the bore. It has been seen that the deposited lubricant will flow in the embodiment in accordance with the invention from the bore into the cavity of the inner axial part where it cannot cause any damage.

Instead of a single bore it is also possible to provide two or more bores which are grouped about the rotational axis of the shaft.

The state of the art and the invention are now explained in closer detail by reference to the drawings, wherein the following is shown in detail:

DETAILED DESCRIPTION

Figure 1:
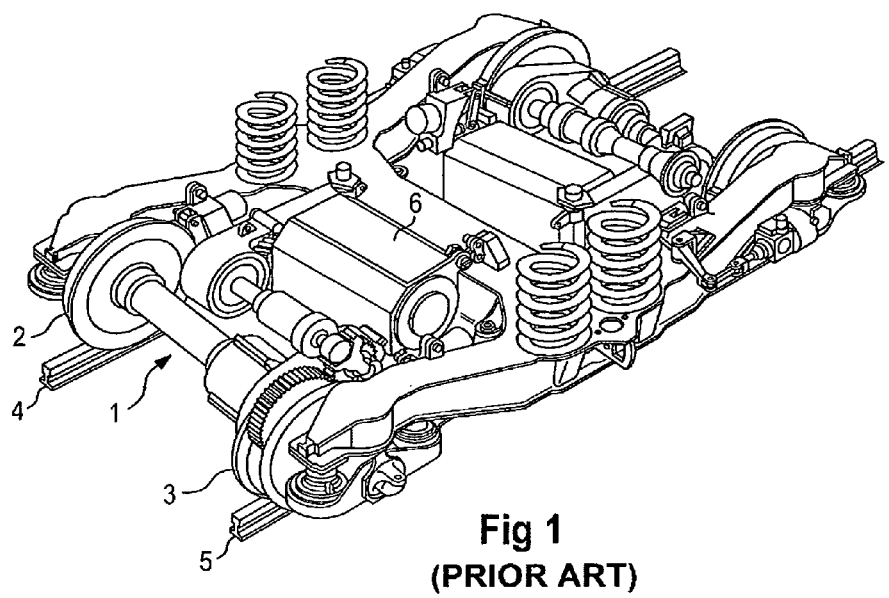
FIG. 1 shows a known bogie for a rail vehicle which comprises two length-adjustable shafts.
Figure 2:
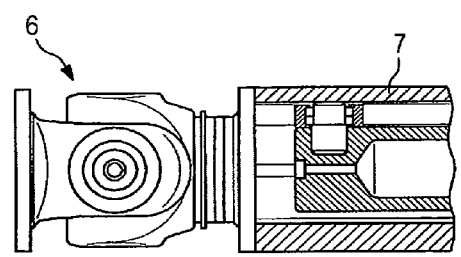
FIG. 2 shows a section of a shaft, partly in an axially sectional view.

The wheelset for a rail vehicle as shown in FIG. 1 comprises two shafts, of which only shaft 1 will be discussed herein. The length of shaft 1 is adjustable. The shaft carries a wheel 2, 3 each at its two ends. The wheels can be rolled off on rails 4, 5.

Figure 3:
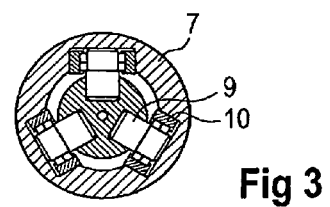
FIG. 3 shows a radial sectional view through the subject matter of FIG. 2 according to the cutting plane III-III.

A universal joint 6 is provided before each wheel 2, 3. The shaft 1 comprises an outer axial part 7 and an inner axial part 8. The axial part 7 is sleeve-like. It rests on the inner axial part 8 via three bearings. The three bearings (tripods) are shown in the sectional view of FIG. 3. The inner axial part 8 comprises blind bores. A bearing pin 9 is embedded in each blind bore. It carries a rolling bearing 10. The rolling bearing 10 engages in a longitudinal groove in the outer axial part 7.

The three rolling bearings 10 thus roll off in the longitudinal grooves during a telescopic movement of the outer and inner axial part 7, 8.

Figure 4:
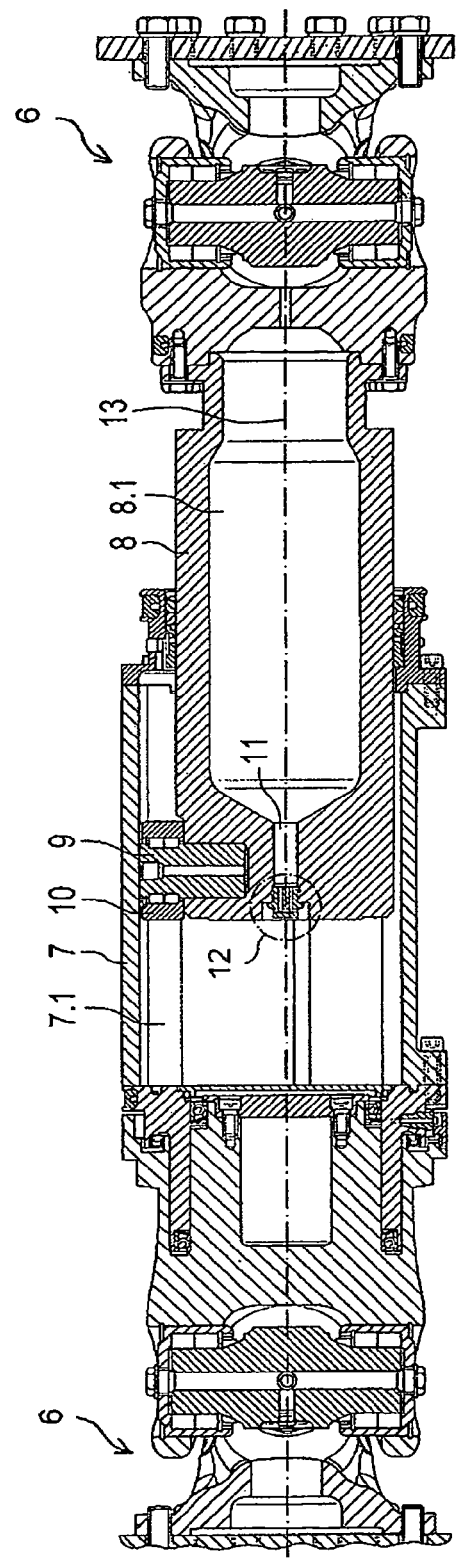
FIG. 4 shows an axial sectional view of a shaft in accordance with the invention.

FIG. 4 shows the arrangement of the entire shaft as follows:

The shaft comprises the outer axial part 7 and the inner axial part 8. A universal joint 6 each is disposed at the end of the shaft.

The inner axial part 8 protrudes to a substantial part into the space enclosed by the outer axial part 7, so that only a residual cavity 7.1 remains. The inner axial part 8 encloses a buffer space 8.1. Cavity 7.1 and buffer space 8.1 are in conductive connection with one another, namely through a vent opening 11. A bore insert 12 is screwed into the same.

One of the three journals 9 with the associated rolling bearing 10 can be seen, which rolling bearing is lubricated with oil.

Cavity 7.1 contains a mixture of air and lubricant mist.

Figure 5:
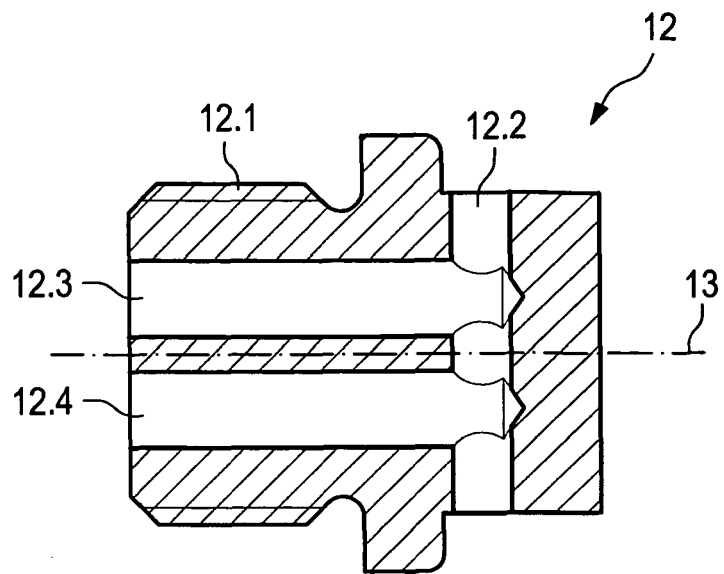
FIG. 5 shows an enlarged view of a venting insert, see section X in FIG. 4.
Figure 6:
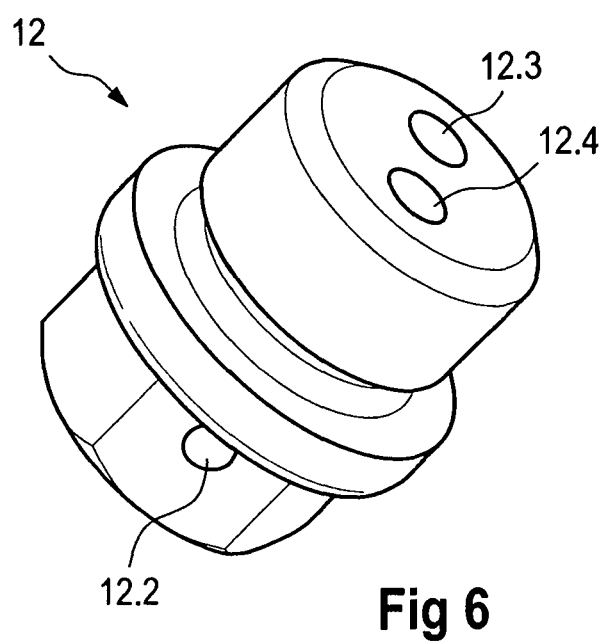
FIG. 6 shows the venting insert in a perspective view.

The arrangement of the bore insert 12 can be seen in FIGS. 5 and 6. The bore insert 12 comprises a thread 12.1 with which it is screwed into the vent opening 11. It is provided with a radial bore 12.2 and with two axial bores 12.3 and 12.4. The axial bores 12.3 and 12.4 extend perpendicularly to the rotational axis 13 of shaft 1. They are offset in the radial direction against rotational axis 13.

Lubricant deposits on the surface of the bores 12.2, 12.3 and 12.4 from the mentioned lubricant mist during operation of shaft 1. Since the two axial bores 12.3 and 12.4 are offset against the rotational axis 13, the lubricant deposits only in the radially outer surface area of the bores 12.3 and 12.4 as a result of centrifugal force. The gradual blocking of the bores is prevented or at least delayed.

The two axial bores 12.3, 12.4 can be inclined in relation to the rotational axis 13 of shaft 1, in the sense that they move away from the rotational axis 13 towards the buffer space 8.1. This promotes the flowing off of deposited lubricant towards the buffer space 8.1.

Figure 7:
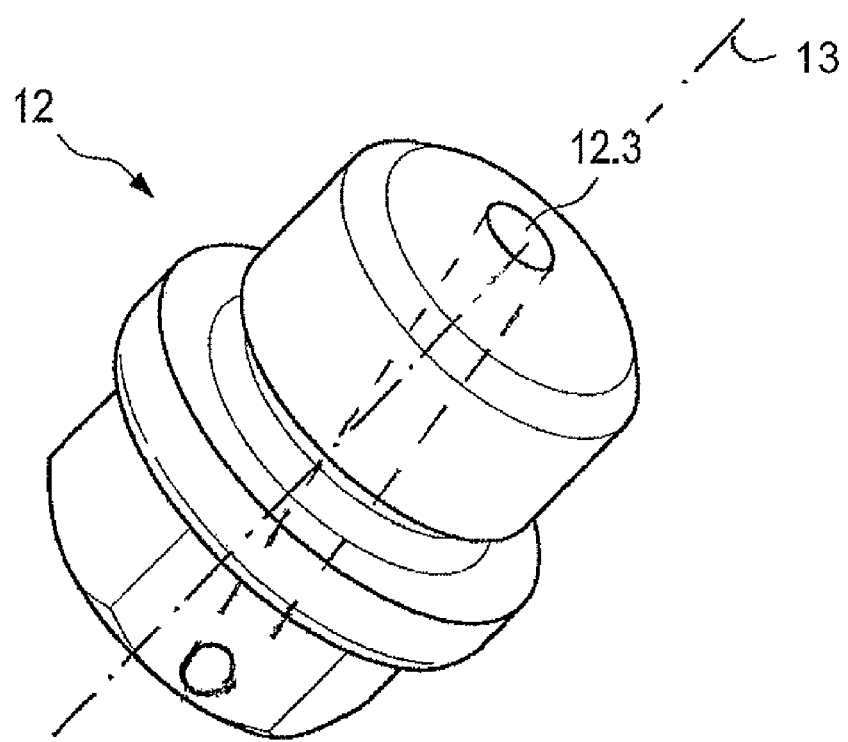
FIG. 7 shows an enlarged view of an inclined axial bore.

FIG. 7 shows the axial bore 12.3 inclined in relation to the rotational axis 13 of shaft 1, in the sense the axial bore 12.3 moves away from the rotational axis 13 towards the buffer space 8.1. This promotes the flowing off of deposited lubricant towards the buffer space 8.1.

The inner axial part 8 has an expansion chamber and further a face wall which immerses into the space which is enclosed by the sleeve-like outer axial part 7. The vent opening 11 is provided in the face wall. It produces a conductive connection between the two mentioned cavities. When the shaft 1 is shortened by pushing the inner axial part 8 into the outer axial part 7, the air is displaced into the cavity 7.1. The air is compressed and thus exerts a damping effect.

The invention claimed is:

1. A length-adjustable shaft, comprising:
an outer sleeve-like axial part;
an inner axial part which can be slid in a telescopic fashion into the outer axial part and be extended from the outer axial part, and which encompasses a buffer space;
with a bearing which is arranged between the two axial parts and can be lubricated with a lubricant;
the end of the inner axial part which can be slid into the outer axial part has a face wall;
a vent opening is provided which conductively connects the buffer space with the cavity enclosed by the outer axial part, and the vent opening is provided in the front wall of the inner axial part;
characterized by the following features:
the vent opening comprises at least one axial bore, where the axial bore is offset against the rotational axis of the shaft.

2. The length-adjustable shaft according to claim 1, characterized in that a bore insert is provided which comprises the at least one axial bore.

3. The length-adjustable shaft according claim 2, characterized in that a radial bore is perpendicular to the at least one axial bore.

4. The length-adjustable shaft according to claim 3, characterized in that the bore insert can be screwed into the vent opening.

5. The length-adjustable shaft according to claim 4, characterized in that the at least one axial bore is inclined against the rotational axis of the shaft and moves away from the rotational axis in the direction towards the buffer space.

6. The length-adjustable shaft according to claim 3, characterized in that the at least one axial bore is inclined against the rotational axis of the shaft and moves away from the rotational axis in the direction towards the buffer space.

7. The length-adjustable shaft according to claim 2, characterized in that the bore insert can be screwed into the vent opening.

8. The length-adjustable shaft according to claim 7, characterized in that the at least one axial bore is inclined against the rotational axis of the shaft and moves away from the rotational axis in the direction towards the buffer space.

9. The length-adjustable shaft according to claim 2, characterized in that the at least one axial bore is inclined against the rotational axis of the shaft and moves away from the rotational axis in the direction towards the buffer space.

10. The length-adjustable shaft according to claim 1, characterized in that a radial bore is perpendicular to the at least one axial bore.

11. The length-adjustable shaft according to claim 10, characterized in that the bore insert can be screwed into the vent opening.

12. The length-adjustable shaft according to claim 11, characterized in that the at least one axial bore is inclined against the rotational axis of the shaft and moves away from the rotational axis in the direction towards the buffer space.

13. The length-adjustable shaft according to claim 10, characterized in that the at least one axial bore is inclined against the rotational axis of the shaft and moves away from the rotational axis in the direction towards the buffer space.

14. The length-adjustable shaft according to claim 1, characterized in that the at least one axial bore is inclined against the rotational axis of the shaft and moves away from the rotational axis in the direction towards the buffer space.

* * * * *